(12) United States Patent
Heo et al.

(10) Patent No.: US 11,657,530 B2
(45) Date of Patent: May 23, 2023

(54) STEREO MATCHING METHOD AND APPARATUS OF IMAGES

(71) Applicant: AJOU UNIVERSITY INDUSTRY—ACADEMIC COOPERATION FOUNDATION, Suwon-si (KR)

(72) Inventors: Yong Seok Heo, Seoul (KR); Jae Cheol Jeong, Suwon-si (KR); Su Yeon Jeon, Daegu (KR)

(73) Assignee: AJOU UNIVERSITY INDUSTRY—ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/743,008

(22) Filed: May 12, 2022

(65) Prior Publication Data
US 2022/0392094 A1     Dec. 8, 2022

(30) Foreign Application Priority Data

Jun. 2, 2021   (KR) ........................ 10-2021-0071453

(51) Int. Cl.
*G06T 7/593*     (2017.01)
(52) U.S. Cl.
CPC ..... *G06T 7/593* (2017.01); *G06T 2207/10012* (2013.01); *G06T 2207/20021* (2013.01); *G06T 2207/20084* (2013.01)
(58) Field of Classification Search
None
See application file for complete search history.

(56) References Cited

U.S. PATENT DOCUMENTS

| 8,810,640 | B2* | 8/2014 | Baba | ........................ H04N 7/00 |
| | | | | 382/128 |
| 10,182,225 | B1* | 1/2019 | Cui | ...................... H04N 5/2258 |
| 10,380,753 | B1* | 8/2019 | Csordás | ................. G06V 10/82 |
| 10,497,129 | B1* | 12/2019 | Cui | ....................... G06V 10/147 |
| 11,062,471 | B1* | 7/2021 | Zhong | ....................... G06T 7/593 |
| 11,178,382 | B1* | 11/2021 | Wang | ........................ G06T 7/85 |

(Continued)

FOREIGN PATENT DOCUMENTS

| KR | 10-2018-0087994 A | 8/2018 |
| KR | 10-2019-0123366 A | 11/2019 |

OTHER PUBLICATIONS

Y. Wang et al., "Anytime Stereo Image Depth Estimation on Mobile Devices," 2019 International Conference on Robotics and Automation (ICRA), 2019, pp. 5893-5900, doi: 10.1109/ICRA.2019. 8794003.*

(Continued)

*Primary Examiner* — Jiangeng Sun
(74) *Attorney, Agent, or Firm* — Sughrue Mion, PLLC

(57) ABSTRACT

Disclosed is a stereo matching method of images performed by a system implemented by a computer, including the steps of: receiving a pair of images obtained at different time points; generating a feature map by extracting features of each pixel of the pair of images; generating sequentially cost volumes for partial time points based on the feature map and generating a feature map for the entire disparity by fusing the cost volumes using 2D convolution; and generating a final disparity map by refining the generated feature map.

8 Claims, 4 Drawing Sheets

(56) References Cited

U.S. PATENT DOCUMENTS

| | | | |
|---|---|---|---|
| 11,308,641 B1* | 4/2022 | Porta | B60R 1/26 |
| 2005/0088435 A1* | 4/2005 | Geng | H04R 25/658 |
| | | | 345/419 |
| 2009/0296980 A1* | 12/2009 | Yi | G06T 7/579 |
| | | | 382/100 |
| 2010/0166294 A1* | 7/2010 | Marrion | G06V 10/757 |
| | | | 382/154 |
| 2017/0019655 A1* | 1/2017 | Mueller | G06T 7/593 |
| 2019/0087635 A1* | 3/2019 | Klaus | H04N 5/23299 |
| 2019/0158799 A1* | 5/2019 | Gao | H04N 13/128 |
| 2021/0103745 A1* | 4/2021 | Chakravarty | G06K 9/6256 |

OTHER PUBLICATIONS

Korean Notification of Reason for Refusal for KR 10-2021-0071453, dated Sep. 30, 2021.
Korean Notice of Allowance for KR 10-2021-0071453, dated Jan. 26, 2022.

* cited by examiner

STEREO MATCHING METHOD AND APPARATUS OF IMAGES

CROSS-REFERENCE TO RELATED APPLICATIONS

This application claims the priority of Korean Patent Application No. 10-2021-0071453 filed on Jun. 2, 2021, in the Korean Intellectual Property Office, the disclosure of which is incorporated herein by reference.

BACKGROUND

Field

The present disclosure relates to stereo matching method and apparatus of images. More particularly, the present disclosure relates to stereo matching method and apparatus of images through 2D convolution of cost volumes.

Description of the Related Art

Stereo matching is a technique for detecting corresponding points in two or more images, and has been studied steadily in a computer vision field. With stereo matching techniques, disparity vectors of corresponding points are used as elements to acquire disparity images, and the acquired disparity images may be used in various fields such as robot vision, image-based rendering or next-generation broadcasting, or the like.

A principle of stereo matching seems to be simple, but the stereo matching is not substantially easy due to the ambiguity of images. The ambiguity of images is generated from the same area and periodic textures and is an important problem in the stereo matching. Various stereo matching algorithms have been proposed to solve this problem. As a method, there is proposed an algorithm including steps of a) initial cost computation, b) cost aggregation, c) disparity optimization, and d) disparity refinement. In the initial cost computation step, the matching cost is calculated to allocate different disparity estimations to different pixels. The cost aggregation is to spatially aggregate initial costs for supporting areas. The disparity optimization is to minimize predefined energy functions locally or globally. The disparity refinement is to refine output disparity images.

Recently, stereo matching networks use a method of processing a 4D cost volume through 3D convolution. This method has an excellent performance in terms of accuracy, but has a disadvantage of requiring a large amount of computing resources and memories. This disadvantage limits the execution of computing hardware in a limited mobile environment. Therefore, it is important in the stereo matching field to improve both accuracy and computing resources.

Accordingly, in the aforementioned stereo matching networks, there is the need for a stereo matching method and apparatus of images capable of improving both accuracy and computing resources.

SUMMARY

An object of the present disclosure is to provide stereo matching method and apparatus of images capable of improving both accuracy and computing resources in stereo matching networks.

The objects to be solved by the present disclosure are not limited to the aforementioned object(s), and other object(s), which are not mentioned above, will be apparent to those skilled in the art from the following description.

An aspect of the present disclosure provides a stereo matching method of images performed by a system implemented by a computer, including the steps of: receiving a pair of images obtained at different time points; generating a feature map by extracting features of each pixel of the pair of images; generating sequentially cost volumes for partial time points based on the feature map and generating a feature map for the entire disparity by fusing the cost volumes using 2D convolution; and generating a final disparity map by refining the generated feature map.

In one embodiment, in the generating of the feature map, the entire disparity may be divided into M partial disparities and a feature map for each partial disparity may be generated by a sequential feature fusion (SFF) module.

In one embodiment, in the generating of the feature map, an output of an n-th SFF module may be used as an input of an n+1-th SFF module.

In one embodiment, the SFF module may receive $F_L(n)$ and $F_R(n)$ and sum $F_R^i(n)$ moving $F_R(n)$ to a right side by i to generate a cost volume $F_L^+(n)$ and processes the generated cost volume $F_L^+(n)$ by a CNN block.

In one embodiment, the entire disparity range may be adjusted by a product of the number M of SFF modules and the shift number S.

Another aspect of the present disclosure provides a stereo matching apparatus of images including: an input/output interface which receives a pair of images obtained at different time points; a feature extraction unit which generates a feature map by extracting features of each pixel of the pair of images; a sequential feature fusion unit which generates sequentially cost volumes for partial time points based on the feature map and generates a feature map for the entire disparity by fusing the cost volumes using 2D convolution; and a refine unit which generates a final disparity map by refining the generated feature map.

According to the present disclosure, by the stereo matching apparatus and method of images, it is possible to perform accurately stereo matching by sequentially generating cost volumes for partial disparities to the entire disparity.

Further, it is possible to improve a processing speed and prevent computing resources from being excessively wasted needlessly by processing the sequentially generated cost volumes by 2D convolution.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
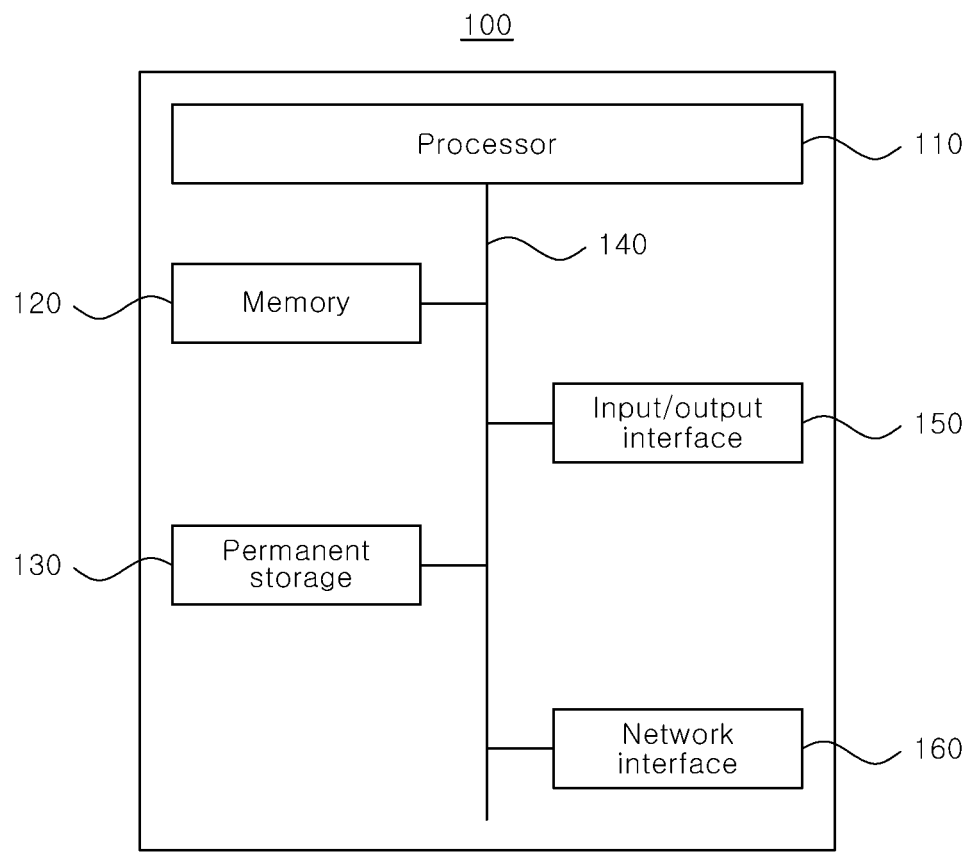
FIG. 1 is a block diagram illustrating a configuration of a stereo matching apparatus of images according to an exemplary embodiment of the present disclosure.

The present disclosure may have various modifications and various embodiments and specific embodiments will be illustrated in the drawings and described in detail in the detailed description. However, the present disclosure is not limited to specific embodiments, and it should be understood that the present disclosure covers all the modifications, equivalents and replacements included within the idea and technical scope of the present disclosure. In describing each drawing, like reference numerals were used for like components.

Terms including first, second, A, B, and the like are used for describing various components, but the components are not limited by the terms. The terms are used only to discriminate one component from the other component. For example, without departing from the scope of the present disclosure, a first component may be referred to as a second component, and similarly, the second component may be referred to as the first component. A term 'and/or' includes a combination of a plurality of associated disclosed items or any item of the plurality of associated disclosed items.

It should be understood that, when it is described that a component is "coupled" or "connected" to the other component, the component may be directly coupled or connected to the other component, but there may be another component therebetween. In contrast, it should be understood that, when it is described that a component is "directly coupled" or "directly connected" to the other component, no component is present therebetween.

Terms used in the present application are used only to describe specific exemplary embodiments, and are not intended to limit the present disclosure. A singular form may include a plural form unless otherwise clearly indicated in the context. The terms such as "comprising, or "having" specify the presence of stated features, integers, steps, operations, elements, components, or combinations thereof, but do not preclude the presence or addition of one or more other features, integers, steps, operations, elements, components, or combinations thereof.

Unless otherwise contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless otherwise defined in the present application.

In the present disclosure, disparity is a position difference between the same points when captured by two left and right cameras. The larger the disparity, the closer, and the smaller the disparity, the farther.

Hereinafter, preferred exemplary embodiments of the present disclosure will be described in detail with reference to the accompanying drawings.

FIG. 1 is a block diagram for describing an example of an internal configuration of a computer system according to an exemplary embodiment of the present disclosure. For example, a stereo matching apparatus of images according to the embodiment may be implemented by a computer system 100 of FIG. 1. As illustrated in FIG. 1, the computer system 100 is a component for performing an object area segmentation method and may include a processor 110, a memory 120, a permanent storage device 130, a bus 140, an input/output interface 150, and a network interface 160.

The processor 110 is a component for object area segmentation and may include any device capable of processing sequences of instructions or may be a part thereof. The processor 110 may include, for example, a computer processor, a processor in a mobile device or other electronic devices, and/or a digital processor. The processor 110 may be included, for example, in a server computing device, a server computer, a series of server computers, a server farm, a cloud computer, a content platform, and the like. The processor 110 may be connected to the memory 120 via the bus 140.

The memory 120 may include a volatile memory, and permanent, virtual, or other memories for storing information used by the computer system 100 or output by the computer system 100. The memory 120 may include, for example, a random access memory (RAM) and/or a dynamic RAM (DRAM). The memory 120 may be used to store any information such as status information of the computer system 100. The memory 120 may be used even to store instructions of the computer system 100, including, for example, instructions for object area segmentation based on an object area segmentation network. The computer system 100 may include one or more processors 110 if necessary or where appropriate.

The bus 140 may include a communication-based structure that enables interactions among various components of the computer system 100. The bus 140 may carry data, for example, between the components of the computer system 100, for example, between the processor 110 and the memory 120. The bus 140 may include a wireless and/or wired communication medium between the components of the computer system 100, and may include parallel, serial, or other topology arrays.

The permanent storage device 130 may include components such as memories or other permanent storage devices as used by the computer system 100 for storing data for a predetermined extended period (for example, as compared with the memory 120). The permanent storage device 130 may include non-volatile main memories as used by the processor 110 in the computer system 100. The permanent storage device 130 may include, for example, a flash memory, a hard disk, an optical disk, or other computer-readable media.

The input/output interface 150 may include interfaces for a keyboard, a mouse, a voice command input, a display, or other input or output devices. Configuration instructions and/or inputs for object area segmentation based on the object area segmentation network may be received via the input/output interface 150.

The network interface 160 may include one or more interfaces for networks such as a local area network or Internet. The network interface 160 may include interfaces for wired or wireless accesses. Configuration instructions and/or inputs for object area segmentation based on the object area segmentation network may be received via the network interface 160.

In addition, in other exemplary embodiments, the computer system 100 may include more components than the components of FIG. 1. However, there is no need to clearly illustrate most of the conventional components. For example, the computer system 100 is implemented to include at least some of the input/output devices connected to the input/output interface 150 described above, or may further include other components such as a transceiver, a global positioning system (GPS) module, a camera, various sensors, and a database.

Figure 2:
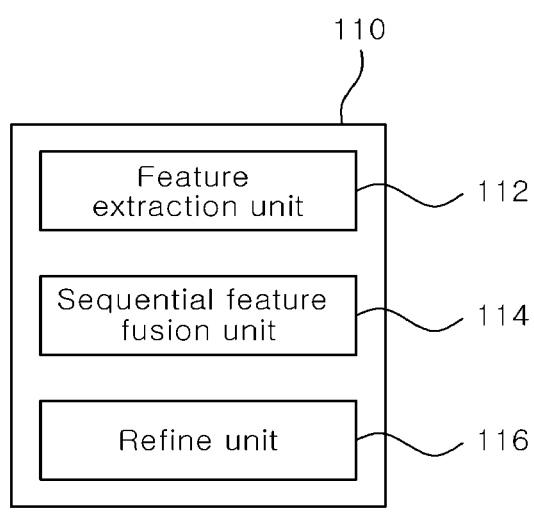
FIG. 2 is a block diagram illustrating an example of components which may be included in a processor of a computer system according to an exemplary embodiment.
Figure 3:
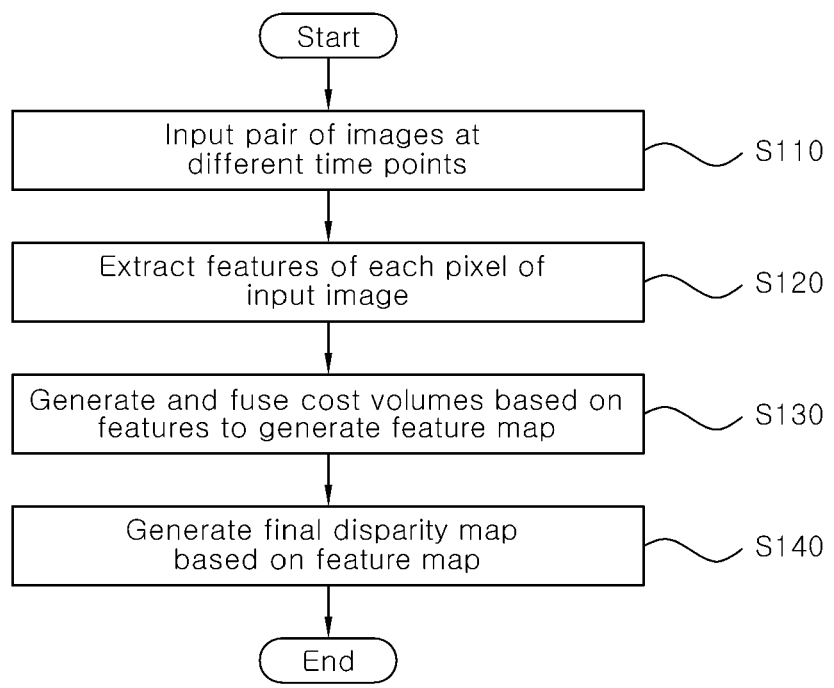
FIG. 3 is a flowchart illustrating an example of a stereo matching method of images which may be performed by a computer system according to an exemplary embodiment.
Figure 4:
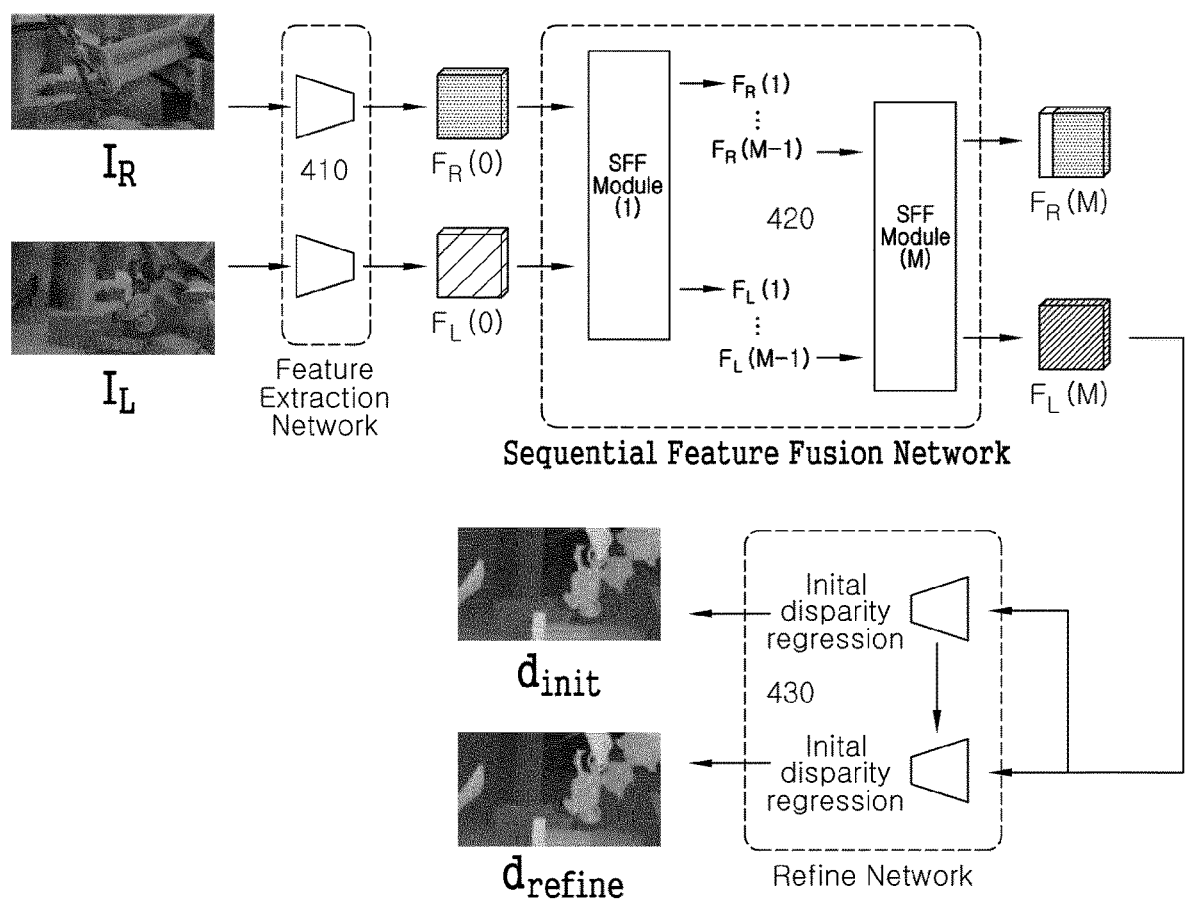
FIG. 4 is a schematic diagram of an overall network for stereo matching of images according to an exemplary embodiment of the present disclosure.

FIG. 2 is a block diagram illustrating an example of components that may be included in the processor of the computer system according to an exemplary embodiment, FIG. 3 is a flowchart illustrating an example of a stereo matching method of images which may be performed by the computer system according to an exemplary embodiment, and FIG. 4 is a schematic diagram of an overall network for stereo matching of images according to an exemplary embodiment of the present disclosure.

As illustrated in FIG. 2, components of the processor 110 may be expressions of different functions performed by the processor 110 according to control instructions provided by at least one program code. The processor 110 and the components of the processor 110 may perform steps of the stereo matching method of images based on a feature extraction network, a sequential feature fusion network, and a refine network of FIG. 3. For example, the processor 110 and the components of the processor 110 may be implemented to execute codes of an operating system included in the memory 120 and instructions according to at least one program code described above. Here, at least one program code may correspond to codes of programs implemented for processing the stereo matching method of images based on the feature extraction network, the sequential feature fusion network, and the refine network. The stereo matching method of images may not occur in the illustrated order, and some of the steps may be omitted or additional steps may be further included.

The processor 110 may load program codes stored in a program file for the stereo matching method of images in the memory 120. For example, the program file for the stereo matching method of images may be stored in the permanent storage device 130 described in FIG. 2, and the processor 110 may control the computer system 100 so that the program codes are loaded in the memory 120 from the program file stored in the permanent storage device 130 via the bus. At this time, the processor 110 and the feature extraction unit 112, the sequential feature fusion unit 114, and the refine unit 116 included in the processor 110 may be different functional expressions of the processor 110 for performing subsequent steps S110 to S140 by executing instructions of the corresponding portion of the program codes loaded in the memory 120, respectively. For the performing of steps S110 to S140, the processor 110 and the components of the processor 110 may process computations according to a direct control instruction or control the computer system 100.

To help the understanding of the description, the operation of FIG. 3 will be described with reference to the structure of the overall network of FIG. 4.

In step S110, as images to be stereo-matched, a pair of images obtained at different time points is received. The images to be stereo-matched are a pair of images obtained at different time points, and for example, may include a left image $I_L$ and a right image $I_R$.

In step S120, the feature extraction unit 112 extracts a feature for expressing each pixel of an input image well. The feature extraction unit 112 extracts features $F_L(0)$ and $F_R(0)$ for forming cost volumes from the input left image $I_L$ and right image $I_R$. To this end, the feature extraction unit 112 adopts a 2D convolution network 410 using a spatial pyramid pooling (SSP) module. By extending a pixel level feature to an area level using different pooling sizes, features generated from the SPP module maintain integrated hierarchical context information. In one embodiment, the feature extraction unit 112 may output a feature map of ¼ size of an original image size for efficient calculation.

In step S130, the sequential feature fusion unit 114 sequentially generates a cost volume for each partial time point with respect to entire time points based on the features and generates a feature map $F_L(M)$ by fusing the features by using 2D convolution using a sequential feature fusion network (SFFNet) 420. The cost volume generation and fusion of the sequential feature fusion unit 114 will be described below with reference to FIGS. 5 and 6.

In step S140, the refine unit 116 generates a final disparity map based on the feature map $F_L(M)$ generated by the sequential feature fusion unit 114.

In one embodiment, the refine unit 116 additionally processes the feature map $F_L(M)$ generated by the sequential feature fusion unit 114 using a light refine network 430. The refine unit 116 generates an initial disparity map $d_{init}$ and a final disparity map $d_{refine}$ by inputting the feature map $F_L(M)$ generated by the sequential feature fusion unit 114 to the light refine network. Herein, the initial disparity is simply generated by processing a function map $F_L(M)$ through a 1×1 convolution network and bilinear upsampling in the SFFNet. The final disparity map $d_{refine}$ is generated by using the processed feature map $F_L(M)$ and an intermediate feature map obtained from the initial disparity map $d_{init}$ processing. This process consists of 5×5 convolution layers and bilinear upsampling.

A total loss function L used to learn the disparity map is defined by Equation 4.

$$L=\gamma_1 V_s(d_{init}-d_{gt})+\gamma_2 V_s(d_{refine}-d_{gt}) \qquad \text{[Equation 4]}$$

Here, $d_{init}$ represents an initial disparity map, $d_{refine}$ represents a final disparity map, and $d_{gt}$ represents an actual disparity map. Here, the values of $\gamma_1$ and $\gamma_2$ represent a loss weight of the initial disparity map and a loss weight of the final disparity map in a total loss function.

Here, a smoothness L1 and a loss function Vs(•) are defined as Equation 5.

$$V_s(x) = \begin{cases} 0.5x^2 & \text{if } |x| \le 1 \\ |x| - 0.5 & \text{otherwise} \end{cases} \qquad \text{[Equation 5]}$$

Figure 5:
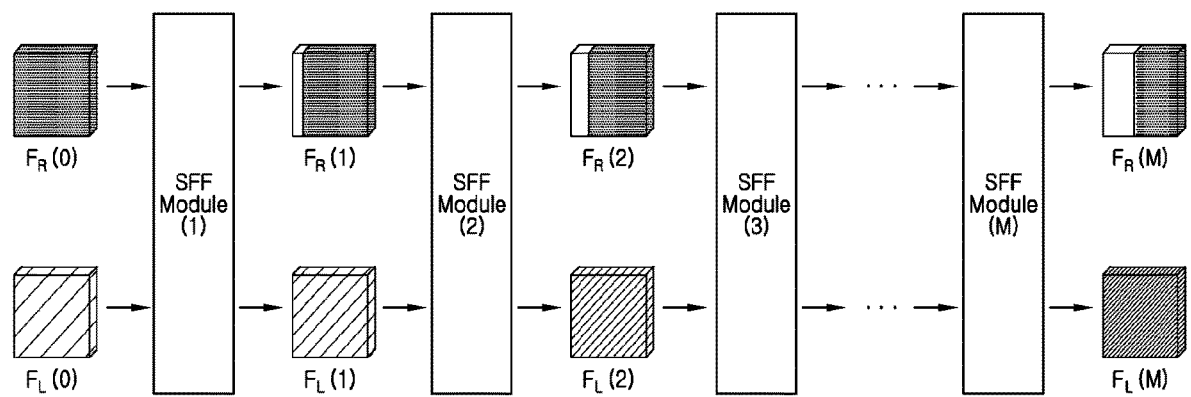
FIG. 5 is a flowchart illustrating a sequential feature fusion network according to an exemplary embodiment of the present disclosure.
Figure 6:
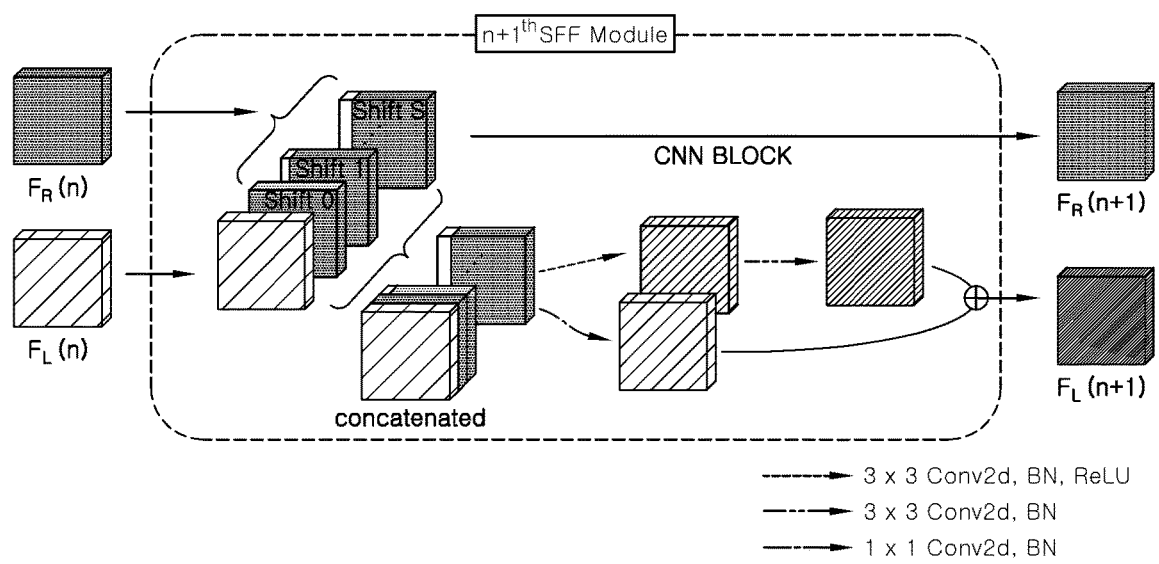
FIG. 6 is a schematic diagram illustrating a sequential feature fusion module according to an exemplary embodiment of the present disclosure.

FIG. 5 is a flowchart of a sequential feature fusion network according to an exemplary embodiment of the present disclosure and FIG. 6 is a schematic diagram of a sequential feature fusion module according to an exemplary embodiment of the present disclosure.

Referring to FIG. 5, in the sequential feature fusion network (SFFNet), the sequential feature fusion unit 114 includes M spatial pyramid pooling (SPP) modules. Outputs $F_L(0)$ and $F_R(0)$ of the feature extraction unit 112 are used as inputs of a first SPP module. Referring to FIG. 6, outputs $F_L(n+1)$ and $F_R(n+1)$ of an n-th SFF module are used as inputs to the next n+1-th SFF module. Only the output $F_L(M)$ of the final SFF module is used as an input of the refine unit 116 for generating the final disparity map. A single SFF module generates a cost volume for a part of the entire disparity range using 2D convolution.

The n-th SPP module processes a disparity range [(n−1)S, nS]. Here, S represents a specific disparity range processed in a single SFF module.

Referring to FIG. 6, the n+1-th SFF module receives feature maps $F_L(n)$ and $F_R(n)$ as an input and outputs feature maps $F_L(n+1)$ and $F_R(n+1)$ to be used as inputs of the n+2-th SFF module. In the same manner, the SFF modules are sequentially connected to each other.

That is, the SFF module of the sequential feature fusion unit 114 first generates a cost volume $F_L^+(n)$ by using inputs $F_L(n)$ and $F_R(n)$, in which $F_L^+(n)$ is generated by summing $F_R^i(n)$ moving $F_L(n)$ and $F_R(n)$ to a right side by i as Equation 1. The generated cost volume $F_L^+(n)$ is processed with a CNN block f as Equation 2, and as a result, $f(F_L^+(n))$ and $F_R^S(n)$ become results $F_L(n+1)$ and $F_R(n+1)$ of the SFF module.

$$F_L^{\rightarrow}(n) = F_L(n) \cdot F_R^1(n) \cdot F_R^2(n) \cdot \ldots \cdot F_R^S(n) \quad \text{[Equation 1]}$$

$$F_L(n+1) = f(F_L^+(n)),$$

$$F_R(n+1) = F_B^S(n) \quad \text{[Equation 2]}$$

The CNN block f(•) includes the sum of results of two 3×3 2D convolutions and one 1×1 2D convolution. The two 3×3 2D convolutions are used to increase a receptive field, while the one 1×1 2D convolution serves as a projection shortcut for forming a residual function.

The n+1-th SFF module generates a cumulative cost volume for a disparity range [0, (n+1)S]. At the same time, a learning area of disparity of S pixels is widened while processing using a series of SFF modules. Specifically, $F_L(n+1)$ includes a cost volume of a reference image for the disparity range [0, (n+1)S], and $F_R(n+1)$ is a feature map of a target image moving by (n+1)S pixels to process the next (n+2)-th SFF module.

The sequential feature fusion unit 114 adjusts the entire disparity range R as Equation 3 through M SFF modules and S shifts.

$$R = S \times M \quad \text{[Equation 3]}$$

The large S value allows one SFF module to learn disparity in a wide range, but if so, the learning about the detailed portion may not be performed well. The number M of the total SFF modules may adjust the depth of the entire network, and as M is larger, an execution time may also be lowered.

The apparatus described above may be implemented in hardware components, software components, and/or a combination of hardware components and software components. For example, the apparatus and the components described in the exemplary embodiments may be implemented using, for example, one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or other any devices capable of executing and responding instructions. The processing device may perform an operating system (OS) and one or more software applications performed on the operating system. In addition, the processing device may also access, store, manipulate, process, and generate data in response to execution of software. For the convenience of understanding, one processing device may be described to be used, but it can be seen to those skilled in the art that the processing device may include a plurality of processing elements and/or a plurality types of processing elements. For example, the processing device may include a plurality of processors or one processor or one controller. In addition, other processing configurations, such as a parallel processor are also possible.

Software may include computer programs, codes, instructions, or one or more combinations thereof, and may configure the processing device to operate as desired, or to instruct independently or collectively the processing device. Software and/or data are interpreted by the processing device or may be embodied in any type of machine, a component, a physical device, virtual equipment, and a computer storage medium or device to provide instructions or data to the processing device. The software may be distributed on a computer system connected via a network, and may be stored or executed in a distributed method. The software and data may be stored in one or more computer-readable recording media.

The method according to the exemplary embodiment may be implemented in a form of program instructions which may be performed through various computer means to be recorded in computer-readable media. The computer-readable media may include program instructions, data files, data structures, and the like alone or in combination. The program instructions recorded in the medium may be specially designed and configured for the exemplary embodiments or may be publicly known to and used by those skilled in the computer software art. Examples of the computer-readable media include magnetic media such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer by using an interpreter and the like, as well as machine language codes created by a compiler.

As described above, although the exemplary embodiments have been described by the restricted exemplary embodiments and the drawings, various modifications and variations can be made from the above description by those skilled in the art. For example, even if the described techniques are performed in a different order from the described method, and/or components such as a system, a structure, a device, a circuit, etc. described above are coupled or combined in a different form from the described method, or replaced or substituted by other components or equivalents, an appropriate result can be achieved.

Therefore, other implementations, other embodiments, and equivalents to the appended claims fall within the scope of the claims to be described below.

What is claimed is:

1. A stereo matching method of images performed by a system implemented by a computer, comprising steps of:
receiving a pair of images obtained at different time points;
generating a feature map by extracting features of each pixel of the pair of images;
generating sequentially cost volumes for each of partial time points based on the feature map and generating a feature map for an entire disparity by fusing the cost volumes using 2D convolution; and
generating a final disparity map by refining the generated feature map,
wherein in the generating of the feature map, the entire disparity is divided into M partial disparities and a feature map for each partial disparity is generated by a sequential feature fusion (SFF) module,
wherein M feature maps corresponding to each M partial disparity are generated from each M SFF, and
wherein the M features maps have the same size, and as a result, each cost volume is the same.

2. The stereo matching method of images of claim 1, wherein in the generating of the feature map, an output of an n-th SFF module is used as an input of an n+1-th SFF module.

3. The stereo matching method of images of claim 1, wherein the SFF module receives $F_L(n)$ and $F_R(n)$ sums $F_R^i(n)$ moving $F_R(n)$ to a right side by i to generate a cost volume $F_L^+(n)$, and processes the generated cost volume $F_L^+(n)$ by a CNN block.

4. The stereo matching method of images of claim 1, wherein a range of the entire disparity is adjusted by a product of the number M of SFF modules and the shift number S.

5. A stereo matching apparatus of images comprising:
an input/output interface which receives a pair of images obtained at different time points;
a feature extraction unit which generates a feature map by extracting features of each pixel of the pair of images;
a sequential feature fusion unit which generates sequentially cost volumes for each of partial time points based on the feature map and generates a feature map for an entire disparity by fusing the cost volumes using 2D convolution; and
a refine unit which generates a final disparity map by refining the generated feature map,
wherein the sequential feature fusion unit divides the entire disparity into M partial disparities and generates a feature map for each partial disparity by a sequential feature fusion (SFF) module,
wherein M feature maps corresponding to each M partial disparity are generated from each M SFF, and
wherein the M feature maps have the same size, and as a result, each cost volume is the same.

6. The stereo matching apparatus of images of claim 5, wherein the sequential feature fusion unit uses an output of an n-th SFF module as an input of an n+1-th SFF module.

7. The stereo matching apparatus of images of claim 6, wherein the SFF module receives $F_L(n)$ and $F_R(n)$ and sums $F_R^i(n)$ moving $F_R(n)$ to a right side by i to generate a cost volume $F_L^+(n)$, and processes the generated cost volume $F_L^+(n)$ by a CNN block.

8. The stereo matching apparatus of images of claim 6, wherein a range of the entire disparity is adjusted by a product of the number M of SFF modules and the shift number S.

\* \* \* \* \*